US012793876B2

(12) United States Patent
Holp et al.

(10) Patent No.: US 12,793,876 B2
(45) Date of Patent: Nov. 10, 2026

(54) SOLENOID ACTUATOR FOR ISOLATION SWITCH AND CIRCUIT INTERRUPTER INCLUDING THE SAME

(71) Applicant: EATON INTELLIGENT POWER LIMITED, Dublin (IE)

(72) Inventors: Tyler Holp, Coraopolis, PA (US); Nicholas David Reynolds, Monroeville, PA (US); Jeffrey Gibson, Hookstown, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/776,443

(22) Filed: Jul. 18, 2024

(65) Prior Publication Data

US 2026/0024691 A1 Jan. 22, 2026

(51) Int. Cl.
*H02H 3/08* (2006.01)
*H01F 7/16* (2006.01)
*H01F 7/18* (2006.01)
*H01H 9/54* (2006.01)

(52) U.S. Cl.
CPC ............. *H01F 7/1805* (2013.01); *H01F 7/16* (2013.01); *H01H 9/547* (2013.01)

(58) Field of Classification Search
CPC ..................................................... H01F 7/1805
See application file for complete search history.

(56) References Cited

U.S. PATENT DOCUMENTS 8,957,748 B2 * 2/2015 Tomimbang ........... H01H 50/32 335/127
11,527,878 B2 * 12/2022 Zhou ...................... H01H 9/542
2011/0068221 A1 * 3/2011 Recksiek ................ B64C 13/42 701/31.4
2014/0201571 A1 * 7/2014 Hosek .................... B25J 9/1674 714/26
2015/0055269 A1 * 2/2015 Kim ....................... H01H 47/22 361/170
2023/0344212 A1 * 10/2023 Jimenez Gonzalez ...................... H02H 1/0007
2025/0070544 A1 * 2/2025 Martin .................. H01H 50/18

* cited by examiner

*Primary Examiner* — Menatoallah Youssef
*Assistant Examiner* — Esayas G Yeshaw
(74) *Attorney, Agent, or Firm* — Eckert Seamans Cherin & Mellott, LLC

(57) ABSTRACT

A circuit interrupter includes a housing; line conductors; load conductors; an isolation switch assembly including isolation switches disposed within the housing, one solenoid actuator disposed external to the housing and between two line conductors, the one solenoid actuator structured to actuate the isolation switches to be open or closed based on a command signal, and an insulating connector connecting the isolation switches and the one solenoid actuator; and a power electronic module disposed within the housing and including a controller and electronic interrupters connected to the controller, the isolation switches and the load conductors, the controller structured to generate and transmit a control signal comprising the command signal to the electronic interrupters or the solenoid actuator, the electronic interrupters structured to allow the current to flow during normal operation and interrupt the current from flowing to the load in the event of a fault based on the control signal.

20 Claims, 6 Drawing Sheets

SOLENOID ACTUATOR FOR ISOLATION SWITCH AND CIRCUIT INTERRUPTER INCLUDING THE SAME

FIELD OF THE INVENTION

The disclosed concept relates generally to a circuit interrupter, and in particular, to a circuit interrupter having a solenoid actuator for isolation switch.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Conventional circuit breakers utilize electromechanical trip devices, typically including a thermally responsive bimetallic strip and an electromagnet that are structured to trip open separable contacts upon detecting an overload and a short circuit condition, respectively. Conventional circuit breakers are effective at isolating faults, but they have some drawbacks including a slow reaction time that increases the risk of equipment damage, fires or explosion. In response, solid state circuit interrupters and hybrid circuit interrupters have been developed. Solid state circuit interrupters use solid state components, e.g., power electronic modules including semiconductor devices, to switch on and off to allow and interrupt current flowing from a power source to a load significantly faster (e.g., without limitation, in microseconds) than the conventional circuit interrupters. Hybrid circuit interrupters include an electronic interrupter (e.g., without limitation, solid state switching devices) and the separable contacts to interrupt fault current from flowing to the load and trip the circuit interrupters upon detecting a fault. As the demand for the hybrid or solid state circuit interrupters increases, the need for retrofitting existing load centers that are tailored to the conventional circuit interrupters with the hybrid or solid state circuit interrupters has emerged. However, retrofitting the existing load centers is very challenging due to, e.g., without limitation, the compact size and regulatory issues associated with the solid-state devices.

There is room for improvement in hybrid or solid state circuit interrupter technology.

SUMMARY OF THE INVENTION

These needs, and others, are met by a circuit interrupter including a housing, line conductors, load conductors, an isolation switch assembly and a power electronic module. The circuit interrupter is structured to be connected between a power source and a load. The isolation switch assembly includes isolation switches disposed within the housing and connected to the line conductors, one solenoid actuator disposed external to the housing and between two line conductors, and an insulating connector connecting the isolations switches and the one solenoid actuator. The one solenoid actuator is structured to actuate the isolation switches to open or close based on a command signal. The power electronic module is disposed within the housing and includes a controller and electronic interrupters connected to the controller, the isolation switches and the load conductors. The controller is structured to generate and transmit a control signal comprising the command signal to the electronic interrupters or the one solenoid actuator. The electronic interrupters are structured to allow the current to flow during normal operation and interrupt the current from flowing to the load in the event of a fault based on the control signal.

Another embodiment provides a circuit interrupter including a housing, line conductors, load conductors, an isolation switch assembly and a power electronic module. The circuit interrupter is structured to be connected between a power source and a load. The isolation switch assembly includes isolation switches disposed within the housing, one solenoid actuator disposed external to the housing and between two line conductors, and an insulating connector connecting the isolation switches and the one solenoid actuator. The one solenoid actuator is structured to actuate the isolations switches to open or close based on a command signal. Each isolation switch includes a movable contactor having a movable contact, a stationary contactor having a stationary contact, and a flexible conductor connecting the movable contactor and respective electronic interrupter. The movable contactor is connected to the insulating connector and the stationary contactor is connected to respective line conductor. The power electronic module is disposed within the housing and includes a controller and electronic interrupters connected to the controller, the movable contactors, the load conductors. The controller is structured to generate and transmit a control signal including the command signal to the electronic interrupters or the one solenoid actuator. The electronic interrupters are structured to allow the current to flow during normal operation and interrupt the current from flowing to the load in the event of a fault based on the control signal.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
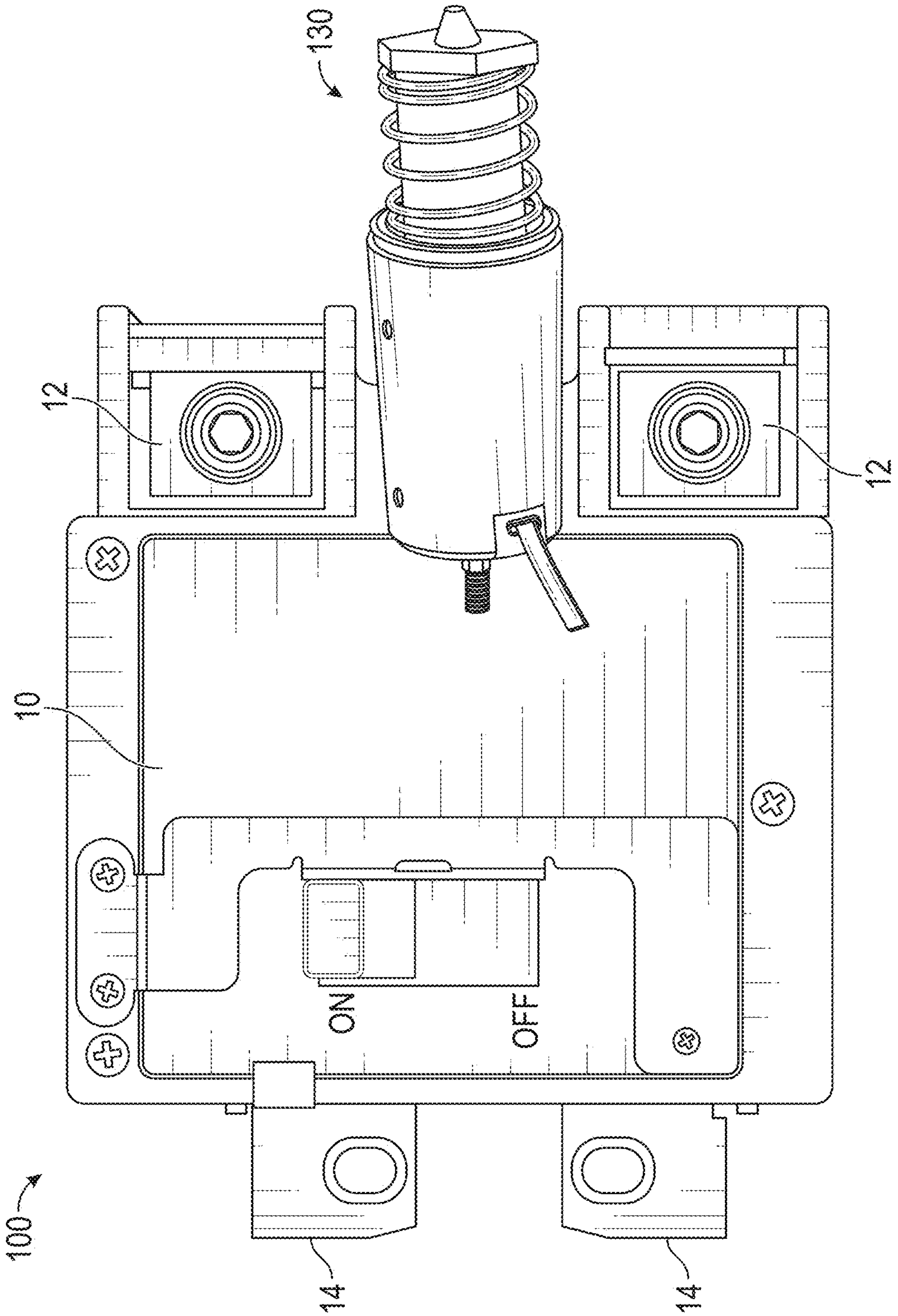
FIG. 1 is an exterior view of an exemplary circuit interrupter having an isolation switch in accordance with a non-limiting, exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
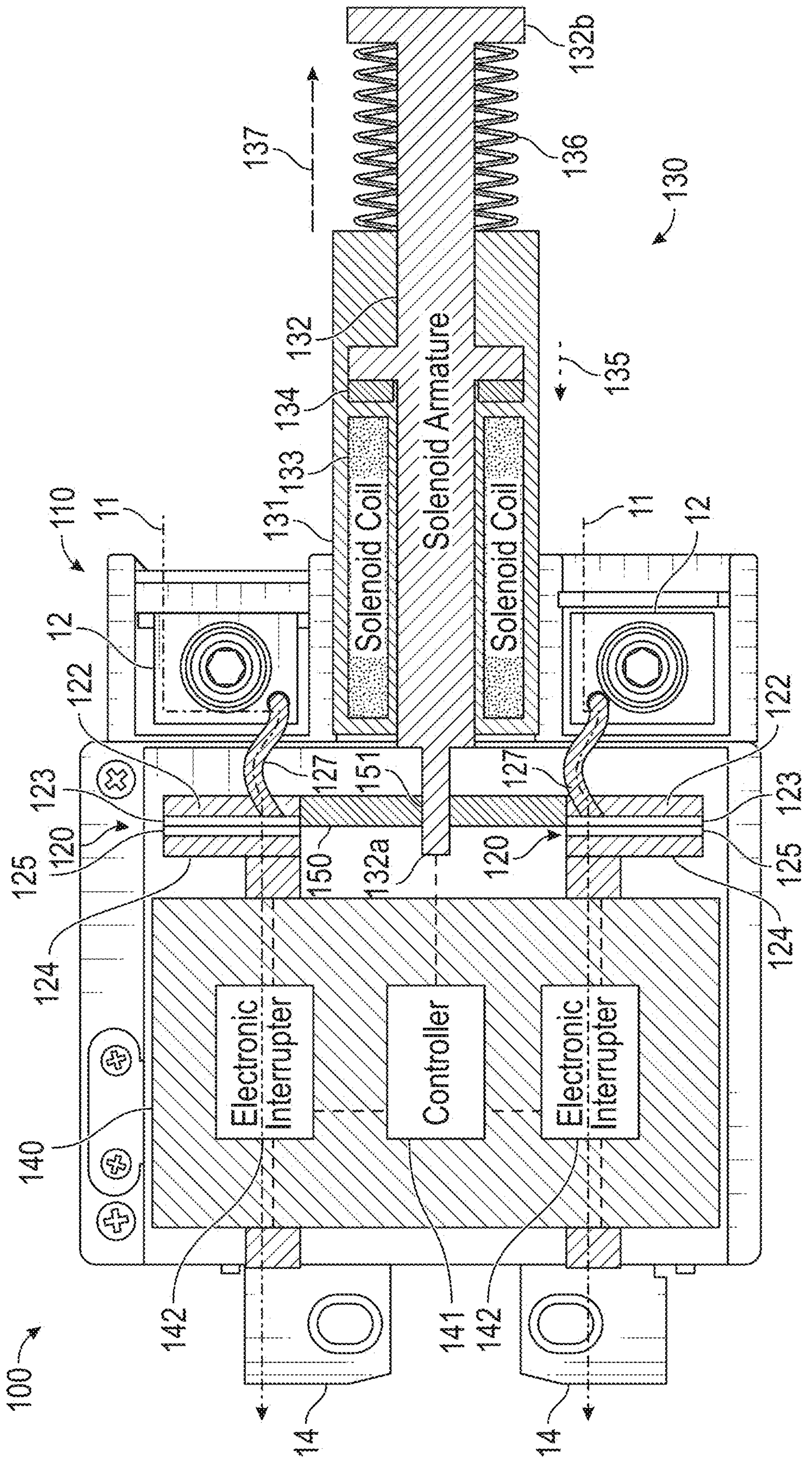
FIG. 2 is an interior view of the exemplary circuit interrupter of FIG. 1 with the isolation switch in a closed state.
Figure 3:
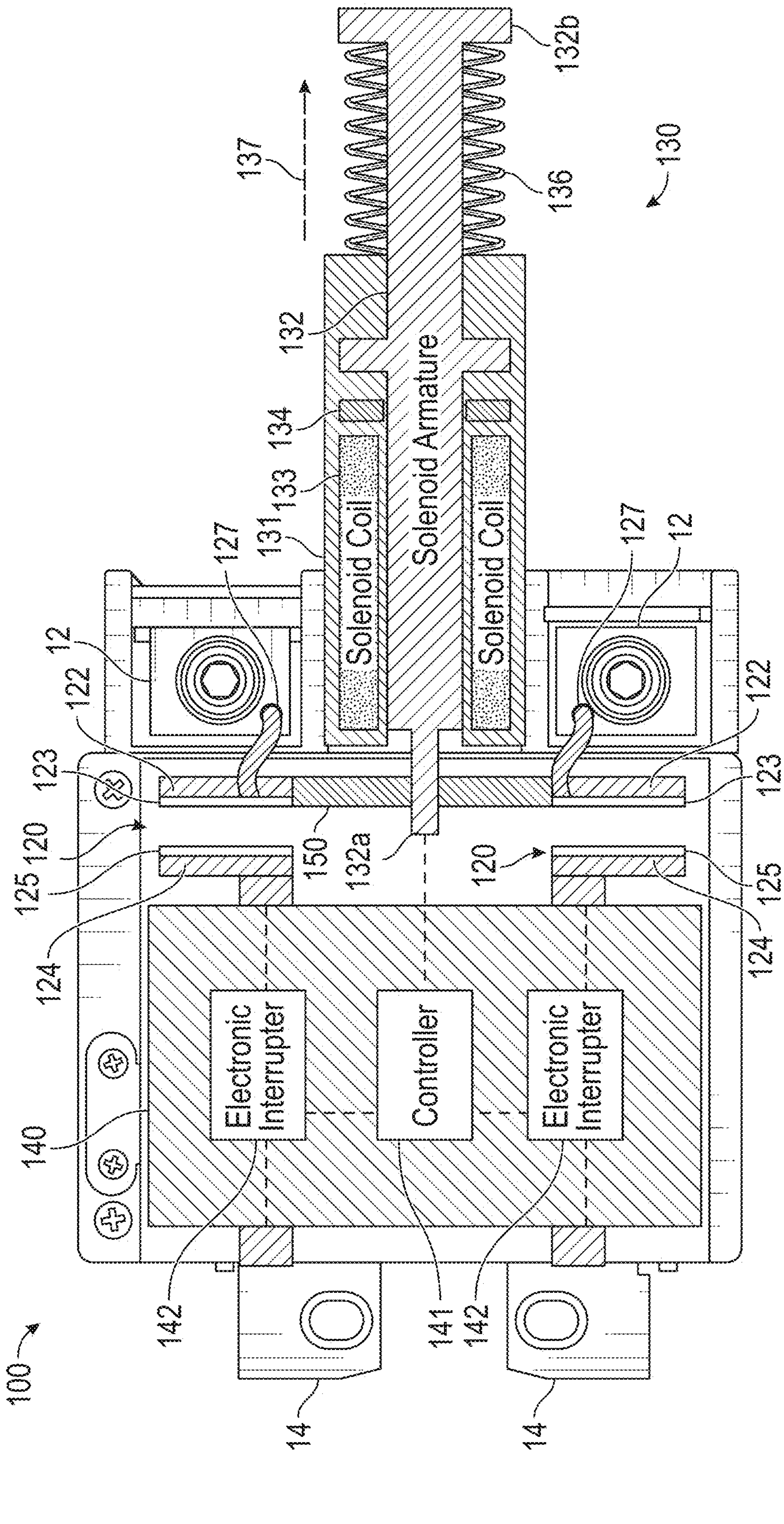
FIG. 3 is an interior view of the exemplary circuit interrupter of FIG. 1 with the isolation switch in an open state.

FIGS. 1-3 illustrate an exemplary circuit interrupter 100 having an isolation switch in accordance with a non-limiting, exemplary embodiment of the disclosed concept. The circuit interrupter 100 may be, e.g., a 2-pole hybrid main breaker or a 2-pole solid state main breaker and structured to interrupt current flowing to a load (not shown) in the event of a fault (e.g., without limitation, a short circuit, an overload, etc.). The circuit interrupter 100 is structured to be fit within existing load centers tailored for conventional circuit interrupters having electromechanical trip mechanisms. The circuit interrupter 100 may have rated voltage and current of, e.g., without limitation, 240V and 225 A, respectively. It includes a housing 10, line conductors 12 and load conductors 14 and is structured to be electrically connected to a power source (not shown) via the line conductors 12 and the load via the load conductors 14. The circuit interrupter 100 further includes an isolation switch assembly 110 and a power electronic module 140.

The power electronic module 140 includes, e.g., without limitation, a controller 141, electronic interrupters 142 and a power supply (not shown). The controller 141 may be, e.g., without limitation, a programmable logic controller (PLC) including input devices, a processing unit, output devices and a power supply. The input devices may include, e.g., without limitations, sensors structured to detect a fault. The processing unit may include a processor, a memory and/or other integrated circuits (e.g., without limitation, Modbus, LAN connection circuits). The processor may be, for example and without limitation, a microprocessor, a microcontroller, or some other suitable processing device or circuitry. The memory can be any of one or more of a variety of types of internal and/or external storage media such as, without limitation, RAM, ROM, EPROM(s), EEPROM(s), FLASH, and the like that stores, e.g., without limitation, programs, control logic, software and instructions for the processor to perform. The output devices may include, e.g., without limitation, the electronic interrupters 142 and the solenoid actuator 130. For example and without limitation, a current transformer as an input device may detect a fault and transmit a signal to the controller 141. The controller 141 in turn generates and transmits a command signal based on the control logic to the output devices such as the electronic interrupter 142 to interrupt fault current from flowing to the load or a solenoid actuator 130 to actuate isolation switches 120 to separate isolation contacts 123,125 and provide galvanic isolation after the interruption.

The electronic interrupter 142 is electrically connected to the controller 141 and includes, e.g., without limitation, semiconductor devices structured to allow current to flow from the power source to the load during normal operation and interrupt current from flowing to the load in an event of a fault. In an exemplary embodiment in which the circuit interrupter 100 is a solid state circuit interrupter, the electronic interrupter 142 may be switched ON during the normal operations and switched OFF upon detection of a fault. In an exemplary embodiment in which the circuit interrupter 100 is a hybrid circuit interrupter, the electronic interrupter 142 may commutate fault current upon detecting a fault until the mechanical contacts (not shown) are tripped open by the operating mechanism. The power supply provides low DC voltage for use by the electrical components within the circuit interrupter 100. Semiconductor devices include one or more solid-state devices including, e.g., without limitation, insulated-gate bipolar transistors (IGBTs), metal-oxide-semiconductor field-effect transistors (MOSFETs), or metal oxide varistors (MOVs). While FIGS. 1-3 illustrate a two-pole single phase circuit interrupter, this is for illustrative purposes only, and thus the circuit interrupter may include more than two poles without departing from the scope of the disclosed concept.

The isolation switch assembly 110 may be, e.g., without limitation, a relay and includes isolation switches 120, a solenoid actuator 130 and an insulating connector 150 connecting the isolations switches 120 and the solenoid actuator 130. The isolation switches 120 are disposed within the housing 10 and structured to be actuated by the solenoid actuator 130 to open or close based on a command signal from the controller 141. Each isolation switch 120 includes a movable contactor 122 having a movable contact 123, a stationary contactor 124 having a stationary contact 125, and a flexible conductor 127 connecting the movable contactor and respective line conductor 12. The flexible conductor 127 allows the movable contactor to move between a closed state in which the movable contact 123 and the stationary contact 125 are fully connected to each other as shown in FIG. 2 and an open state in which the movable contact 123 and the stationary contact 125 are fully separated and apart as shown in FIG. 3. The stationary contactor 124 is connected to the respective electronic interrupter 142. Thus, in the closed state, current flows in a current path 11 including a line conductor 12, an isolation switch 120, an electronic interrupter 142, and a load conductor in series (i.e., a line conductor 12→an isolation switch 120→an electronic interrupter 142→a load conductors 14).

The solenoid actuator 130 is disposed external to the housing 10 and between the line conductors 12 so as to enable retrofitting of the existing load centers for the conventional electromechanical circuit interrupters with the hybrid or solid state circuit interrupters 100. The solenoid actuator 130 may be, e.g., without limitation, a latching solenoid and includes a solenoid housing 131, a solenoid armature 132, solenoid coils 133, a permanent magnet 134 and a spring 136. The solenoid armature 132 has a first end 132*a* and a second end 132*b* opposite the first end 132*a*. The solenoid armature 132 is connected to the insulating connector 150 at the first end 132*a*. The solenoid coils 133 are wound around a portion of the armature 132 near the first end 132*a*. The spring 136 is wound around a portion of the armature 132 near the second end 132*b*. The spring 136 has spring force (restoring force) directed toward the second end 132*b*.

During normal operation, the controller 141 generates and transmits a command signal (a first current pulse) to the solenoid actuator 130 to actuate the contacts 123,125 to close. The first current pulse lasts a brief period (e.g., without limitation, microseconds) and includes one polarity. When the first current pulse having the one polarity is applied to the solenoid coils 133, the solenoid coils 133 become energized and the energized solenoid coils 133 generate an electromagnetic field in the same direction as the magnetic field of the permanent magnet 134. Thus, the electromagnetic flux adds to the permanent magnetic flux, producing a magnetic latching force that pushes the solenoid armature 132 inward as shown by an arrow 135. Pushing the solenoid armature 132 inward actuates the movable contactors 123 to move towards the stationary contactors 125 and place the contacts 123,125 in the closed state as illustrated in FIG. 2. As the solenoid armature 132 is pushed towards the stationary contacts 125, the spring 136 is displaced or extended in the same direction and exerts the spring force in a direction opposite to the magnetic latching force as shown by the arrow 137. Upon closing the contacts 123,125, the first current pulse is discontinued and the contacts 123,125 are maintained in the closed state without requiring continuous current.

When a fault is detected by, e.g., without limitation, a current transformer, the controller 141 automatically generates and transmits a command signal (a second current pulse) to the solenoid actuator 130 to actuate the contactors 122,124 to separate and place the contacts 123,125 and place them in the open state. The second current pulse lasts a brief period similar to the first current pulse, but includes the opposite polarity. Thus, when the second current pulse having the opposite polarity is applied to the solenoid coils 133, the energized solenoid coils 133 generate an electromagnetic field in the opposite direction as the magnetic field of the permanent magnet, and thus the electromagnetic flux cancels the permanent magnetic flux. The cancellation of the permanent magnetic flux allows the spring force to pull the solenoid armature 132 outward. Pulling the solenoid armature 132 outward actuates the movable contactors 122 to move away from the stationary contactors 124 and separate and place the contacts 123,125 in the open state as illustrated in FIG. 3.

The insulating connector 150 is fixedly attached to the moving contactors 122 at respective edges and extends vertically therebetween. The insulating connector 150 is also fixedly attached to a first end of a solenoid armature 132 at a mid-section 151. The mid-section 151 may be a thru-hole via which the first end 132*a* of the solenoid armature 132 passes and is fixedly attached thereto. Thus, the insulating connector 150 connects the moving contactors 122 and the solenoid armature 132 such that an inward movement and an outward movement of a single solenoid armature 132 cause both of the moving contactors 122 to move to the closed state and the open state, respectively. Thus, a single solenoid actuator 130 disposed outside of the housing 10 of the circuit interrupter 100 can simultaneously actuate both of the isolation switches 120, thereby allowing retrofitting of the existing load centers including the conventional circuit interrupters with the inventive circuit 100 without having to redesign or restructure the load centers. The insulating connector 50 may be, e.g., without limitation, nylon.

Figure 4:
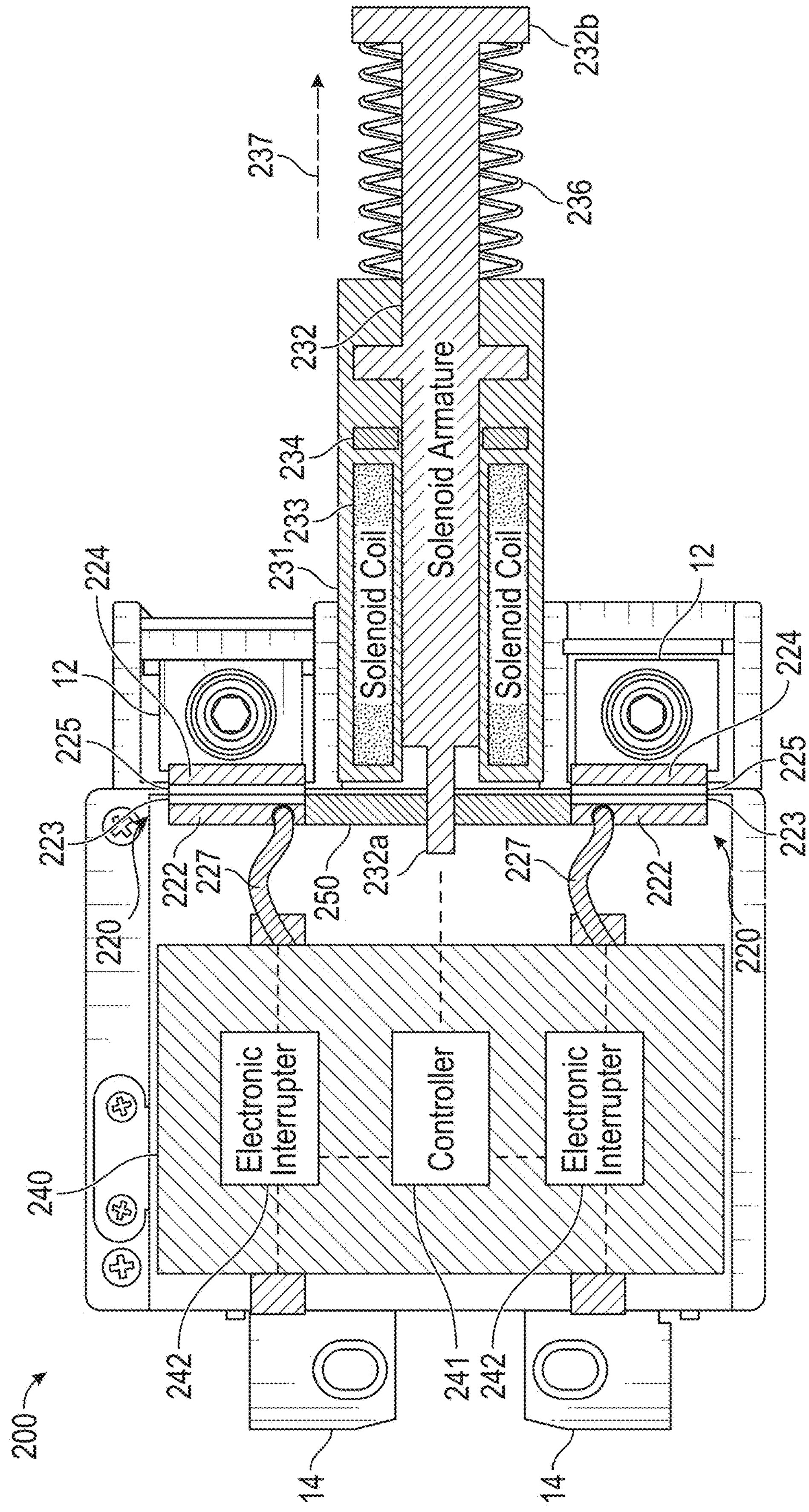
FIG. 4 is an interior view of another exemplary circuit interrupter with an isolation switch in a closed state in accordance with a non-limiting, exemplary embodiment of the disclosed concept.
Figure 5:
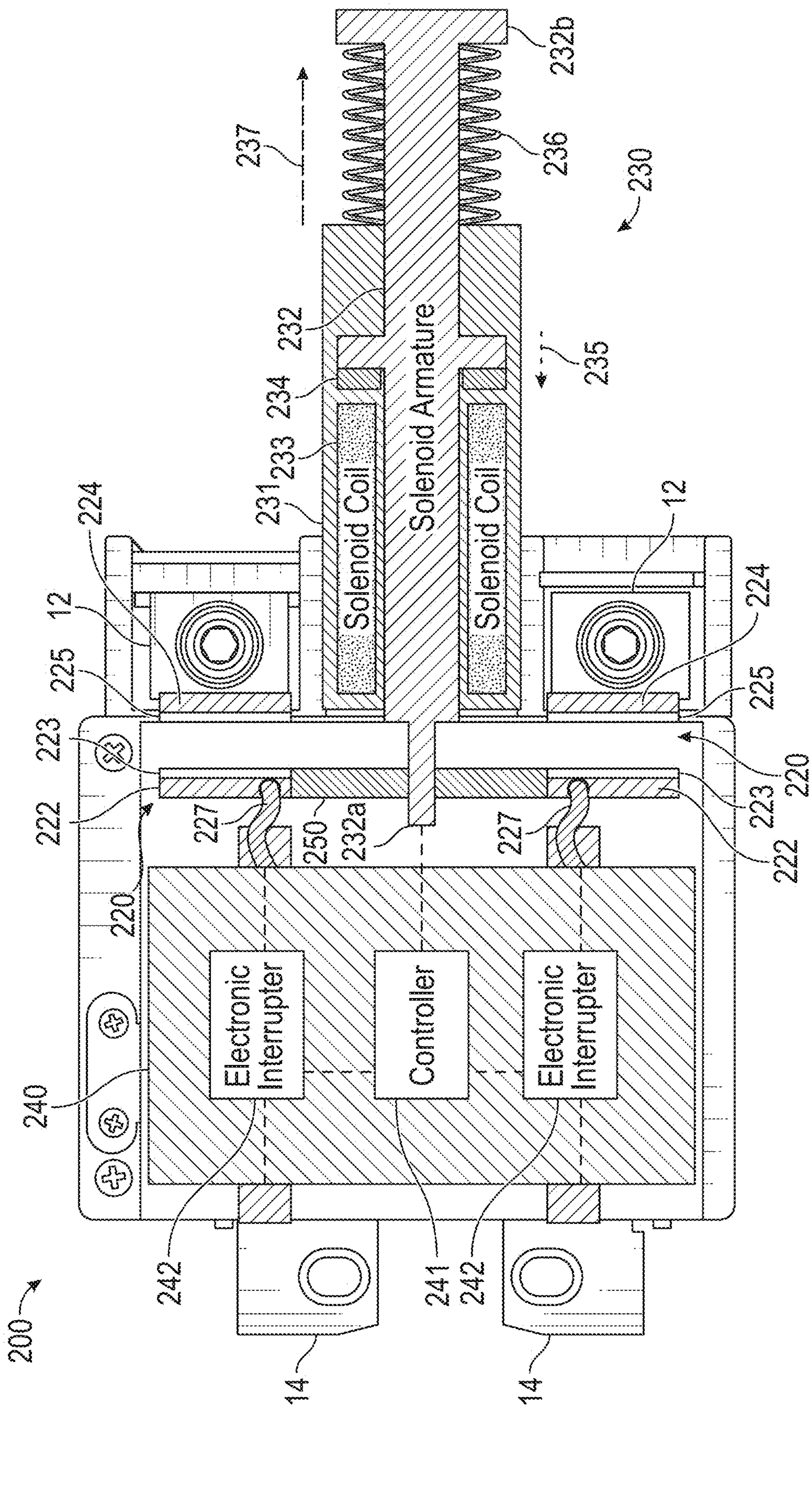
FIG. 5 is an interior view of the exemplary circuit interrupter of FIG. 4 with the isolation switch in an open state.

FIGS. 4-5 illustrate another exemplary circuit interrupter 200 in accordance with a non-limiting, example embodiment of the disclosed concept. The circuit interrupter 200 is similar to the circuit interrupter 100 of FIGS. 1-3, and thus overlapping description is omitted for the sake of brevity. The circuit interrupter 200 differs from the circuit interrupter 100 in that the placement of the movable contactors 222 and the stationary contactors 224 in the circuit interrupter 200 is reversed from the placement of the movable contacts 122 and the stationary contactors 124 in the circuit interrupter 100. That is, the movable contactors 222 are connected to respective electronic interrupters 242 and the stationary contactors 224 are connected to respective line conductors 12.

During the normal operation, the controller 241 generates and transmits the second current pulse having the opposite polarity to the solenoid actuator 230 to close the contacts 233,235. The second current pulse energizes the solenoid coils 233, which in turn generates the electromagnetic field in the opposite direction of the magnetic field generated by the permanent magnet 134. Thus, the electromagnetic flux cancels the permanent magnetic flux. Accordingly, the spring force pulls the solenoid armature 232 outward as shown by the arrow 237. Pulling the solenoid armature 232 outward actuates the movable contactors 222 to move towards the stationary contactors 224 and place the contacts 223,235 in the closed state as illustrated in FIG. 4. In an event of a fault, the controller 241 automatically generates and transmits the first current pulse having the one polarity to the solenoid actuator 230 to open the contacts 223,225. When the first current pulse is applied to the solenoid coils 233, the energized solenoid coils 233 generate an electromagnetic field adding to the permanent magnetic field generated by the permanent magnet 234. The electromagnetic flux and the permanent magnetic flux together produce the magnetic latching force. Due to the switched arrangement of the movable contactors 222 and the stationary contactors 224, the magnetic latching force, however, pushes the solenoid armature 232 inward as shown by an arrow 235. The pushing of the solenoid armature 132 actuates the movable contactors 222 to move away from the stationary contactors 224 and separate and place the contacts 223,225 in the open state as illustrated in FIG. 5.

Figure 6:
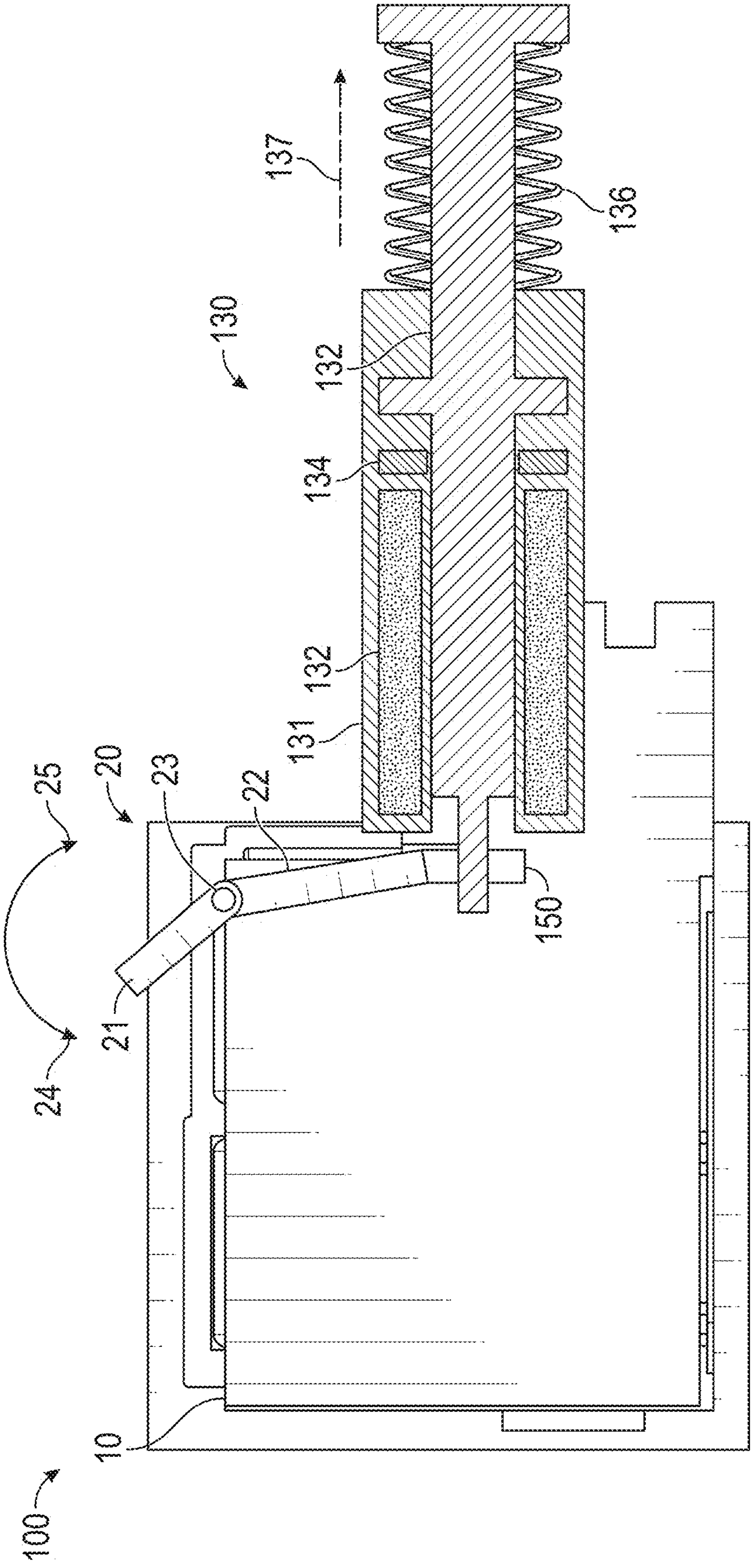
FIG. 6 is a partial interior view of the circuit interrupter of FIG. 1 illustrating manual actuation of a solenoid actuator of the circuit interrupter.

While FIGS. 2-5 illustrate the isolation switches 120,220 being automatically actuated based on a short current pulse generated by the controller 141,241, the isolations switches 120,220 may also be manually actuated. FIG. 6 is a partial interior view of the circuit interrupter 100 and illustrates manual actuation of the solenoid actuator 130 (and thus, the isolation switches 120,220) using a lever 20. The lever 20 is pivotably connected to the housing via a connecting mechanism (e.g., without limitation, a screw) 23. The lever 20 includes a handle portion 21 and a leg 22. The handle portion 21 extends outward from the connecting mechanism 23 and is structured to be manually actuated by a user for actuating the solenoid actuator 130. The leg 22 is disposed within the housing 10 and extends vertically downward from the handle portion 21. The leg 22 is connected to the insulating connector 150. While FIG. 6 does not show the contactors 122,124, the contacts 123, 125 and other components of the circuit interrupter 100 for the sake of clarity of illustration, it is to be understood that the circuit interrupter 100 includes the contactors 122, 124, contacts 123,125 and other components thereof as described with reference to FIGS. 2-3. Further, while FIG. 6 shows the circuit interrupter 100 having the lever 20, it is to be understood that the circuit interrupter 200 or any other embodiments in accordance with the disclosed concept may also include the lever 20 as described herein.

During the normal operation, a user manually pulls the handle portion 21 in the clockwise direction 25. As the handle portion 21 is pulled, the lever 20 pivots clockwise and causes the leg 22 to pull the insulating connector 150 inward. Pulling the insulating connector 150 inward in turn moves the solenoid armature 132 in a direction opposite to the direction 137 of the spring force. As previously described with reference to FIG. 2, moving the solenoid armature 132 inward actuates the movable contactor 122 to move toward the stationary contactor 124 and place the contacts 123,125 in the closed state. In the event of a fault or for maintenance, the user may manually push the handle portion 21 in the counterclockwise direction 24. As the lever 20 pivots counterclockwise, the leg 22 in turn pushes the insulating connector 150 outward. Pushing the insulating connector 18 outward in turn moves the solenoid armature 132 in same direction as the direction 137 of the spring force. As described with reference to FIG. 3, the moving of the solenoid armature 132 outward actuates the movable contactor 122 to move away from the stationary contactor 124 and place the contacts 123,125 in the open state.

The exemplary embodiments of the disclosed concept provide numerous advantages not only over the conventional circuit interrupters, but also in successfully retrofitting the existing load centers including the conventional circuit interrupters therein. For example, the novel placement of a single solenoid actuator 130,230 between two line conductors 12 and outside of the housing 10 of the circuit interrupter 100,200 allows retrofitting the existing load centers designed for the conventional circuit interrupters without having to make any structural changes therein. That is, the users can simply remove the conventional circuit interrupters from the load centers and replace them with the circuit interrupters 100,200 without having to perform additional wiring or redesigning of the load centers. Such easy retrofitting results in convenience and cost savings otherwise required to replace the existing load centers with the new load centers designed for the hybrid or solid state circuit interrupters. Once retrofitted, the ultrafast response time of the hybrid or solid state circuit interrupters is instantly available, thereby preventing equipment damage that may otherwise occur due to the slow response time of the conventional circuit interrupters. Further, by connecting a single solenoid actuator 130,230 to both of the isolation switches 120,220 (e.g., without limitation, in a 2-pole hybrid or solid state circuit interrupters) via the insulating connector 150,250, the exemplary embodiments allow the solenoid actuator 130,230 to open and close the 2 poles simultaneously and provide galvanic isolation for both poles upon opening the isolation switches 120,220. In addition, the circuit interrupters 100,200 in accordance with the disclosed concept are specifically designed to withstand, e.g., without limitation, 10× rated current (approximately 2,250 Amp) and provide the required contact force for each pole (e.g., without limitation, less than equal to 4.45 N (i.e., 10 lbf)). Furthermore, the exemplary embodiments allow the solenoid actuator 130,230 to be actuated automatically by the controller 141,241 or manually via the lever 20, thereby enabling the user to control the isolations switches 120,220 remotely and/or locally as needed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A circuit interrupter structured to be connected between a power source and a load, the circuit interrupter comprising:

a housing;

line conductors;

load conductors;

an isolation switch assembly including isolation switches disposed within the housing and connected to the line conductors, one solenoid actuator at least partially disposed external to the housing, with at least a portion of solenoid coils of the one solenoid actuator arranged external to the housing, and between the line conductors, the one solenoid actuator structured to actuate the isolation switches to open or close based on a command signal, and an insulating connector connecting the isolation switches and the one solenoid actuator; and a power electronic module disposed within the housing and including a controller and electronic interrupters connected to the controller, the isolation switches, and the load conductors, the controller structured to generate and transmit a control signal comprising the command signal to the electronic interrupters or the one solenoid actuator, the electronic interrupters structured to allow a current to flow during normal operation and interrupt the current from flowing to the load in the event of a fault based on the control signal.

2. The circuit interrupter of claim 1, wherein the one solenoid actuator comprises:

a solenoid armature having a first end and a second end opposite the first end, the solenoid armature connected to the insulating connector at the first end;

the solenoid coils wound around a solenoid armature portion near the first end;

a permanent magnet; and a spring wound around a solenoid armature portion near the second end, the spring having spring force directed toward the second end, the spring arranged external to the housing.

3. The circuit interrupter of claim 2, wherein each of the isolation switches comprises:

a movable contactor having a movable contact and connected to one end of the insulating connector at an edge;

a stationary contactor having a stationary contact and connected to an electronic interrupter, and a flexible conductor connecting the movable contactor and a respective line conductor.

4. The circuit interrupter of claim 3, wherein the command signal comprises a first current pulse having one polarity and a second current pulse having the opposite polarity, each current pulse lasting a brief period.

5. The circuit interrupter of claim 4, wherein upon receiving the first current pulse from the controller, the one solenoid actuator generates a magnetic latching force directed toward the first end and structured to move the solenoid armature inward, and wherein moving the solenoid armature inward actuates each movable contactor to move toward each respective stationary contactor and place each movable contact and each respective stationary contact in a closed state.

6. The circuit interrupter of claim 5, wherein each movable contact and each respective stationary contact remain in the closed state after the controller discontinues the first current pulse.

7. The circuit interrupter of claim 4, wherein upon receiving the second current pulse from the controller, the one solenoid actuator allows the spring force to move the solenoid armature outward, and wherein moving the solenoid armature outward actuates each movable contactor to move away from each respective stationary contactor and place each movable contact and each respective stationary contact in an open state.

8. The circuit interrupter of claim 7, wherein each movable contact and each respective stationary contact remain in the open state after the controller discontinues the second current pulse.

9. The circuit interrupter of claim 1, wherein current flows in a current path including a line conductor, an isolation switch, an electronic interrupter, and a load conductor in series.

10. The circuit interrupter of claim 1, further comprising:

a lever connected to the one solenoid actuator via the insulating connector and structured to manually actuate the one solenoid actuator to open or close the isolation switches.

11. The circuit interrupter of claim 1, wherein the circuit interrupter is a 2-pole solid state circuit interrupter or a 2-pole hybrid circuit interrupter.

12. The circuit interrupter of claim 1, wherein the isolation switches are structured to provide galvanic isolation when the isolation switches are open.

13. A circuit interrupter structured to be connected between a power source and a load, the circuit interrupter comprising:

a housing;

line conductors;

load conductors;

an isolation switch assembly including isolation switches disposed within the housing, one solenoid actuator disposed at least partially external to the housing and between the line conductors, the one solenoid actuator structured to actuate the isolation switches to open or close based on a command signal, and an insulating connector connecting the isolation switches and the one solenoid actuator, each isolation switch including a movable contactor having a movable contact, a stationary contactor having a stationary contact, and a flexible conductor connecting the movable contactor and respective electronic interrupter, the movable contactor connected to the insulating connector, the stationary contactor connected to a respective line conductor; and a power electronic module disposed within the housing and including a controller and electronic interrupters connected to the controller, each movable contactor, and the load conductors, and the controller structured to generate and transmit a control signal including the command signal to the electronic interrupters or the one solenoid actuator, the electronic interrupters structured to allow a current to flow during normal operation and interrupt the current from flowing to the load in the event of a fault based on the control signal.

14. The circuit interrupter of claim 13, wherein the one solenoid actuator comprises:

a solenoid armature having a first end and a second end opposite the first end, the solenoid armature connected to the insulating connector at the first end;

solenoid coils wound around a solenoid armature portion near the first end;

a permanent magnet; and a spring wound around a solenoid armature portion near the second end, the spring having spring force directed toward the second end.

15. The circuit interrupter of claim 14, wherein the command signal comprises a first current pulse having one polarity and a second current pulse having the opposite polarity, each current pulse lasting a brief period.

16. The circuit interrupter of claim 15, wherein upon receiving the first current pulse from the controller, the one solenoid actuator generates a magnetic latching force directed toward the first end and structured to move the solenoid armature inward, and wherein moving the solenoid armature inward actuates each movable contactor to move away from each respective stationary contactor and place each movable contact and each respective stationary contact in an open state.

17. The circuit interrupter of claim 15, wherein upon receiving the second current pulse from the controller, the one solenoid actuator allows the spring force to move the solenoid armature outward, and wherein moving the solenoid armature outward actuates each movable contactor to move toward each respective stationary contactor and place each movable contact and each respective stationary contact in a closed state.

18. The circuit interrupter of claim 13, wherein current flows in a current path including a line conductor, an isolation switch, an electronic interrupter, and a load conductor in series.

19. The circuit interrupter of claim 13, further comprising:

a lever connected to the one solenoid actuator via the insulating connector and structured to manually actuate the one solenoid actuator to open or close the isolation switches.

20. The circuit interrupter of claim 13, wherein the circuit interrupter is a 2-pole solid state circuit interrupter or a 2-pole hybrid circuit interrupter.

* * * * *